US007329177B1

(12) United States Patent
Hui

(10) Patent No.: US 7,329,177 B1
(45) Date of Patent: Feb. 12, 2008

(54) WAGERING GAME AND METHOD TO PLAY

(76) Inventor: Victor Hui, 8078 Palace Monaco, Las Vegas, NV (US) 89117

(*) Notice: Subject to any disclaimer, the term of this patent is extended or adjusted under 35 U.S.C. 154(b) by 791 days.

(21) Appl. No.: 10/614,767

(22) Filed: Jul. 8, 2003

(51) Int. Cl.
*A63F 13/00* (2006.01)

(52) U.S. Cl. .......... 463/11

(58) Field of Classification Search .......... 463/11, 463/12, 13, 16, 20, 21, 22; 273/274
See application file for complete search history.

(56) References Cited

U.S. PATENT DOCUMENTS 5,372,366 A * 12/1994 Gohlke .......... 273/274
6,837,788 B2 * 1/2005 Cannon .......... 463/16
6,902,479 B1 * 6/2005 D'Avanzo .......... 463/18
2004/0090004 A1 * 5/2004 Dreaper et al. .......... 273/292
2004/0104531 A1 * 6/2004 Dreaper et al. .......... 273/274

* cited by examiner

*Primary Examiner*—Ronald Laneau
(74) *Attorney, Agent, or Firm*—Rob L. Phillips; Greenberg Traurig

(57) ABSTRACT

A wagering game playable in a live setting or on an electronic gaming machine is disclosed. The embodiments of the wagering game include a means for generating two sets of random over/under numbers, one or more decks of cards and a game layout. The means for generating the over/number numbers may be a spinning wheel in combination with a wheel divider or an electronic random number generator. Once the over/under numbers are generated, players may place over/under, odd/even and posts wagers. Based on a value of two cards received by each players, the wagers are resolved. If the value of the two cards is 0 or 9, the player is dealt a third and final card. Then, based on the value of the three cards, the wagers are resolved. The posts wagers win if the value of a three card hand is 0 or 9. Tracking and displaying game outcomes is also disclosed.

37 Claims, 13 Drawing Sheets

| BET | REGULAR PAY OFF (IF 2 CARDS ADD UP TO 1 TO 8) | REGULAR PAY OFF (IF 3 CARDS ADD UP TO 1 TO 8) | 3RD CARD RULE PAY OFF (IF 3 CARDS ADD UP TO 0 OR 9) | HOUSE EDGE FOR 1 DECK |
|---|---|---|---|---|
| OVER<br>UNDER | 0.95 TO 1<br>0.95 TO 1 | 0.95 TO 1<br>0.95 TO 1 | TIE<br>TIE | 2.27 %<br>2.27 % |
| ODD<br>EVEN | 1 TO 1<br>1 TO 1 | 1 TO 1<br>1 TO 1 | LOSE<br>LOSE | 7.80 %<br>10.37 % |
| POSTS | LOSE | LOSE | 8 TO 1 | 18.23 % |

| NUMBER | (1) | (2) | (3) | (4) | (5) | (6) | (7) | (8) |
|---|---|---|---|---|---|---|---|---|
| OVER RANGE | 1,2,3,4 | 2,3,4,5 | 3,4,5,6 | 4,5,6,7 | 5,6,7,8 | 6,7,8,1 | 7,8,1,2 | 8,1,2,3 |
| UNDER RANGE | 5,6,7,8 | 6,7,8,1 | 7,8,1,2 | 8,1,2,3 | 1,2,3,4 | 2,3,4,5 | 3,4,5,6 | 4,5,6,7 |

FIG. 3

| | | | | | | | | | |
|---|---|---|---|---|---|---|---|---|---|
| OVER | 1,2,3,4 | 1,2,3,6 | 1,2,3,8 | 1,2,4,5 | 1,2,4,7 | 1,2,5,6 | 1,2,5,8 | 1,2,6,7 | 1,2,7,8 |
| UNDER | 5,6,7,8 | 4,5,7,8 | 4,5,6,7 | 3,6,7,8 | 3,5,6,8 | 3,4,7,8 | 3,4,6,7 | 3,4,5,8 | 3,4,5,6 |
| OVER | 1,3,4,6 | 1,3,4,8 | 1,3,6,8 | 1,4,5,6 | 1,4,5,8 | 1,4,6,7 | 1,4,7,8 | 1,5,6,8 | 1,6,7,8 |
| UNDER | 2,5,7,8 | 2,5,6,7 | 2,4,5,7 | 2,3,7,8 | 2,3,6,7 | 2,3,5,8 | 2,3,5,6 | 2,3,4,7 | 2,3,4,5 |
| OVER | 5,6,7,8 | 4,5,7,8 | 4,5,6,7 | 3,6,7,8 | 3,5,6,8 | 3,4,7,8 | 3,4,6,7 | 3,4,5,8 | 3,4,5,6 |
| UNDER | 1,2,3,4 | 1,2,3,6 | 1,2,3,8 | 1,2,4,5 | 1,2,4,7 | 1,2,5,6 | 1,2,5,8 | 1,2,6,7 | 1,2,7,8 |
| OVER | 2,5,7,8 | 2,5,6,7 | 2,4,5,7 | 2,3,7,8 | 2,3,6,7 | 2,3,5,8 | 2,3,5,6 | 2,3,4,7 | 2,3,4,5 |
| UNDER | 1,3,4,6 | 1,3,4,8 | 1,3,6,8 | 1,4,5,6 | 1,4,5,8 | 1,4,6,7 | 1,4,7,8 | 1,5,6,8 | 1,6,7,8 |

FIG. 4

| | IF 2 CARDS ADD UP TO 1 TO 8 | IF 3 CARDS ADD UP TO 1 TO 8 | IF 3 CARDS ADD UP TO 0 | IF 3 CARDS ADD UP TO 9 | |
|---|---|---|---|---|---|
| BET | REGULAR PAYOUT | REGULAR PAYOUT | 3RD CARD RULE PAYOUT (2) | 3RD CARD RULE PAYOUT (3) | HOUSE EDGE FOR 1 DECK |
| OVER<br>UNDER | 1 TO 1<br>1 TO 1 | 1 TO 1<br>1 TO 1 | LOSE 50%<br>LOSE 50% | PUSH<br>PUSH | 2.49 %<br>2.49 % |
| ODD<br>EVEN | 1 TO 1<br>1 TO 1 | 1 TO 1<br>1 TO 1 | LOSE 50%<br>LOSE 50% | LOSE 50%<br>LOSE 50% | 3.26 %<br>5.83 % |
| POSTS | LOSE | LOSE | 8 TO 1 | 8 TO 1 | 18.23 % |

FIG. 7A

| BET | IF 2 CARDS ADD UP TO 1 TO 8<br>REGULAR PAYOUT | IF 3 CARDS ADD UP TO 1 TO 8<br>REGULAR PAYOUT | IF 3 CARDS ADD UP TO 0<br>3RD CARD RULE PAYOUT (2) | IF 3 CARDS ADD UP TO 9<br>3RD CARD RULE PAYOUT (3) | HOUSE EDGE FOR 1 DECK |
|---|---|---|---|---|---|
| OVER | 1 TO 1 | 1 TO 1 | PUSH | LOSE 50% | 2.06 % |
| UNDER | 1 TO 1 | 1 TO 1 | PUSH | LOSE 50% | 2.06 % |
| ODD | 1 TO 1 | 1 TO 1 | LOSE 50% | LOSE 50% | 3.26 % |
| EVEN | 1 TO 1 | 1 TO 1 | LOSE 50% | LOSE 50% | 5.83 % |
| POSTS | LOSE | LOSE | 8 TO 1 | 8 TO 1 | 18.23 % |

FIG. 7B

—OVER OR UNDER PAY 0.95 TO 1

WAGERING GAME AND METHOD TO PLAY

FIELD OF THE INVENTION

The embodiments of the present invention relate to a wagering game. More particularly, a wagering game utilizing playing cards in combination with a means for generating multiple sets of random numbers.

BACKGROUND OF THE INVENTION

As the popularity of gaming continues to explode, casinos and gaming establishments strive for new and unique wagering games. Moreover, as electronic gaming machines, including slot and video poker machines, now occupy the majority of casino floor space, casinos are in constant need of new table games to satisfy the segment of the gaming public that finds electronic gaming machines undesirable. Ideally, new wagering games have a live table version and an electronic gaming machine version to provide casinos with wagering games which satisfy all players.

Along with the need for new wagering games, the aforementioned popularity has seen casinos and gaming manufacturers inundated with new wagering games. Unfortunately, many of the new wagering games suffer from significant drawbacks. In many cases the new games are complicated, require considerable time to resolve wagers and significantly favor the house. Contrarily, casinos desire wagering games which are easy to comprehend, which permit quick wager resolution and which moderately favor the house. Games with such features promote more plays of the game per preestablished duration and generate significant revenue for the casino regardless of the house advantage. Moreover, wagering games utilizing known gaming indicia, including playing cards, tend to attract players more readily than games relying on any new gaming indicia.

It is also apparent that wagering games which enhance or are similar to popular well-established wagering games, such as Blackjack, Baccarat, Roulette and Craps, have a head start at attracting players. For example, many side wagers related to Blackjack have become successful in the casino industry.

The embodiments of the present game incorporate each of the desirable features disclosed above. Nonetheless, the embodiments of the instant wagering game provide a new thrill and challenge for both experienced and new gaming players.

SUMMARY OF THE INVENTION

Accordingly, the embodiments of the present invention utilize one or more decks of cards, a means for generating two sets of random numbers and a game layout. In basic terms, players may wager that a combined value of two or three dealt cards is within a set of over or under numbers, are odd or even or match a maximum or minimum preestablished number. In some respects, the embodiments of the game have a slight resemblance to Baccarat.

In a first live embodiment of the game, players place wagers on a table layout designed for seven or more players. The players may place over/under, odd/even and posts wagers. Initially, a set of random over numbers and set of under numbers are generated with either a mechanical spinning wheel or an electronic random number generator (RNG).

In an embodiment using the mechanical wheel, the wheel is used to generate two sets of four unique random numbers between 1 and 8. Ideally, the numbers 1 through 8 are evenly spaced and consecutively arranged about the perimeter of the wheel. Alternatively, the numbers 1 through 8 are evenly spaced and randomly arranged about the perimeter of the wheel. A divider bisects the wheel such that subsequent to each spin of the wheel four numbers are above the divider and four numbers are below the divider. The four numbers above the divider are the over numbers and the four numbers below the divider are the under numbers. For example, in a consecutive number arrangement, the over numbers may be 2-3-4-5 and the under numbers may be 6-7-8-1. When arranged consecutively, the set of over numbers and the set of under numbers will include 2 odd numbers and 2 even numbers each. In a random number arrangement, the over numbers may be 1-2-6-8 and the under numbers may be 3-4-5-7. When arranged randomly, there is no odd or even number breakdown with respect to the sets of over and under numbers. In either arrangement, there are eight unique possible over/under combinations when using the wheel.

In an embodiment using the RNG, seventy combinations are possible. However, for the sake of brevity only sets of over/under numbers each having two even and two odds numbers are detailed herein. For other combinations (e.g., a set of over numbers having three odd and one even number and a set of under numbers having three even and one odd number), new probabilities, odds and payouts must be determined. With the RNG, the two sets of random numbers formed by using each of the numbers between 1 and 8 are dynamic and can take any random pattern prior to each activation of the RNG. For example, the over numbers may be 1-3-4-6 and the under numbers may be 2-5-7-8.

Ideally, when using the wheel or RNG, a display device displays the sets of over and under numbers so that players know their values.

Once the set of over and set of under numbers are generated, the players may place over/under, odd/even or posts wagers. After all wagers have been placed, each player is dealt two face down cards. A two card combined hand value is then calculated by a dealer. Tens and face cards have a value of zero, Aces have a value of one and the 2-9 cards have their depicted value. The calculated hand value is based on modulo 10. Therefore, two fives, which have a combined value of 10, are treated as zero, while a six and seven, which have a combined value of thirteen, are treated as three. In other words, the final hand value is equated to the ones digit of the two digit number.

The over wager is won when the combined value of the player's two cards matches one of the four over numbers and the under wager is won when the combined value of the player's two cards matches one of the four under numbers. In a first payout schedule, players are paid 0.95 to 1 on winning over/under wagers. Since the over/under wager is approximately a 50-50 proposition, the first embodiment provides the house with a 5% commission. An alternative payout schedule is disclosed below.

The odd wager is won when the value of the player's cards is an odd number between 1 and 8 inclusive and the even wager is won when the value of the player's cards is an even number between 1 and 8 inclusive. In the first payout schedule, players are paid 1 to 1 on winning odd/even wagers.

If the combined value of the two cards is 0 or 9 (termed a "post"), the player is always dealt a third card. If the combined value of the three cards is 0 or 9, the posts wagers win. All other three card values (e.g., 1 through 8) result in a losing posts wager. Players are paid 8 to 1 on winning posts wagers. If the combined value of the three cards is 0 or 9, the over/under wager is deemed a tie such that wagering players push. For three card values of 0 or 9, players lose the odd/even wager. If the combined value of the three cards is between 1 and 8 inclusive, the over/under and odd/even wagers are paid out identically to the two card payouts disclosed above. In an alternative embodiment, winning over/under and odd/even wagers are paid 1 to 1 on combined hand values between 1 and 8 inclusive. If three cards are dealt (i.e., a two card value of 0 or 9), the players lose one-half of the over and under wagers on a combined three card value of 0 and push on a combined three card value of 9. The payouts can be reversed so that a three card value of 0 results in a push of the over and under wagers and a three card value of 9 results in a loss of one-half of the over and under wager. Further, if three cards are dealt, the players lose one-half of the odd and even wagers on a combined three card value of either 0 or 9. This alternative payout schedule eliminates the necessity of the 5% commission. In practice, the elimination of the 5% commission creates a cleaner and simpler game. Ultimately, the casinos offering the game will decide on the preferred payout schedule.

In a second live version of the game, the layout is designed for six players and a community hand. Players may elect to wager on their own hand, the community hand or both. Non-seated players standing about the table may wager on the community hand as well. In the player hands and community hand embodiment, each player is dealt a two card hand along with a single two card community hand centrally positioned on the layout. The same payout rules disclosed above apply to wagers on the community hand. As will be discussed in greater detail, if no players wager on the community hand, it is still dealt to ensure accurate game trends.

In a third live version of the game, only a community hand is dealt. In the community hand embodiment, all players, whether seated at the table or standing thereabout, only wager on the single dealt community hand.

Regardless of the embodiment of the game, it is preferred that the over/under numbers remain fixed for a preestablished duration. For example, the generated random numbers may remain fixed for sixty hands of play. Other durations of time are contemplated herein. The idea is to generate a trend of game outcomes that players rely on in an effort to beat the embodiments of the game. Much like Roulette where a display device records the previous twenty or so game outcomes, the instant game may utilize a display device to show a preestablished number of previous game outcomes. Preferably, the display device records all community hand outcomes associated with the duration of each set of random numbers. Alternatively, the over/under numbers may be altered for each play of the game.

Some of the embodiments of the instant game can also be facilitated by an electronic gaming machine. Said electronic game embodiments are set forth in detail below. Additionally, other rules, variations, enhancements and embodiments of the game disclosed herein are described in great detail below.

BRIEF DESCRIPTION OF THE DRAWINGS

FIG. 3 illustrates a table of possible over/under outcomes associated with the mechanical wheel;

FIG. 4 illustrates a table of possible over/under outcomes, having two odd and two even over/under numbers, associated with a random number generator;

FIG. 7A illustrates a second pay table and an associated house edge;

FIG. 7B illustrates an alternative second pay table and an associated house edge;

DETAILED DESCRIPTION

Figure 1:
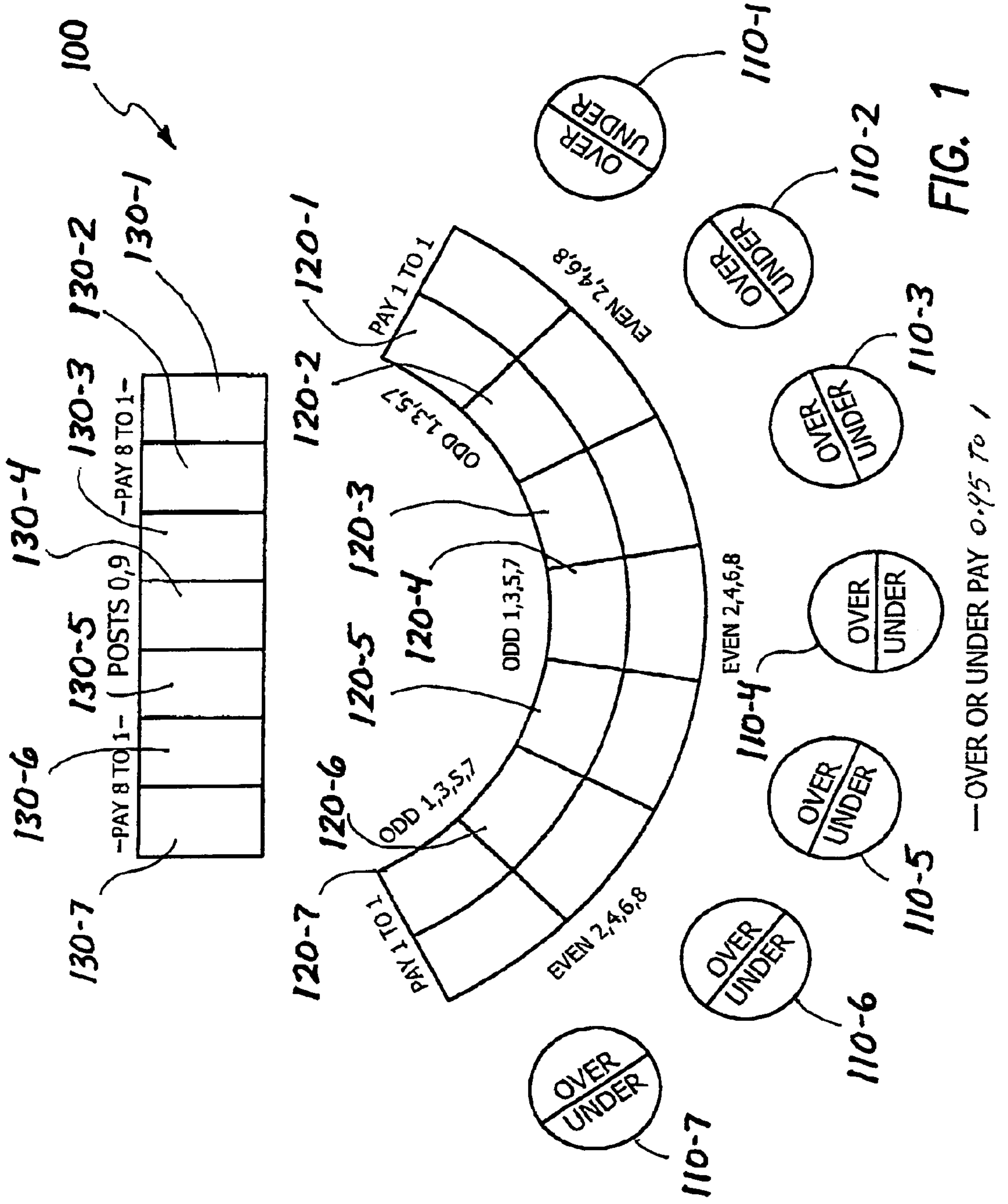
FIG. 1 illustrates a first table game layout.

Reference is now made to the figures wherein like parts are referred to by like numerals throughout. FIG. 1 illustrates a first table layout generally designated as reference numeral 100. The layout 100 incorporates seven over/under wager areas 110-1 through 110-7, seven odd/even wager areas 120-1 through 120-7 and seven posts wager areas 130-1 through 130-7. The layout 100 is only illustrative and may incorporate more or less than seven player positions.

The over/under wager areas 110-1 through 110-7 are spaced such that each area 110-1 through 110-7 corresponds to a player seat position. Each over/under wager area 110-1 through 110-7 is divided into an over wager section and an under wager section. Therefore, if desired, players place their wager in either the over section or the under section. The odd/even wager areas 120-1 through 120-7 are adjacent to the over/under wager areas 110-1 through 110-7. Each odd/even wager area 120-1 through 120-7 is divided into an odd section and an even section. Again, players desiring to make said odd/even wager place their wager in either the odd section or the even section. The seven posts wager areas 130-1 through 130-7 are centrally located along an upper edge of the table layout 100.

Adjacent to each of the wager areas is a payout associated with the specific wagers. As shown on layout 100, winning even/under wagers pay 0.95 to 1, winning odd/even wagers pay 1 to 1 and winning posts wagers pay 8 to 1. Alternative payout schedules are also contemplated and are detailed below.

Figures 2, 6:
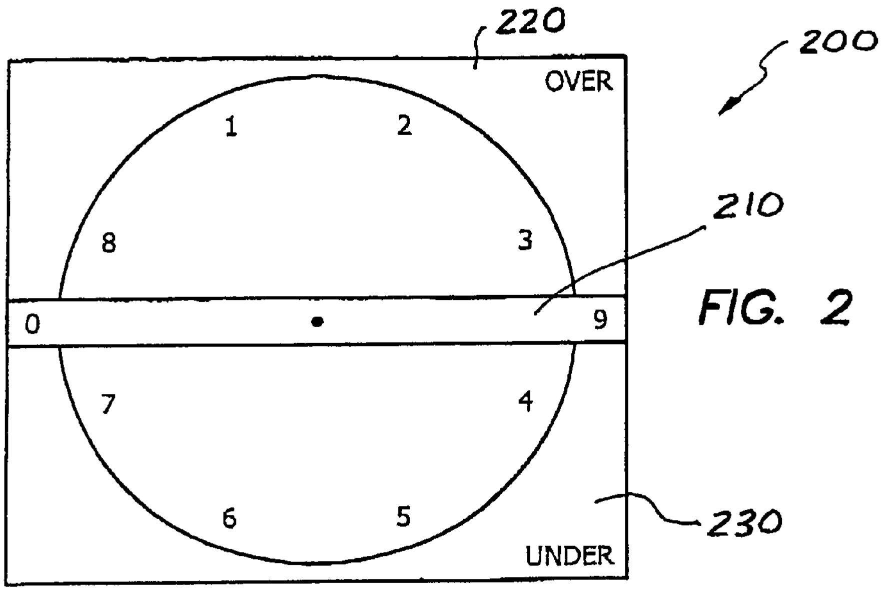
FIG. 2 illustrates a mechanical wheel for generating two sets of random numbers.
FIG. 6 illustrates a first pay table and an associated house edge.

Now referring to FIG. 2, a mechanical spinning wheel 200 includes the numbers 1 through 8 arranged consecutively thereon. Alternatively, the numbers 1 through 8 can be randomly arranged on the wheel 200. A horizontal divider 210 separates the wheel 200 into an over section 220 and an under section 230. Thus, upon each spin of the wheel, the divider 210 defines four over numbers 220 and four under numbers 230.

Figure 9:
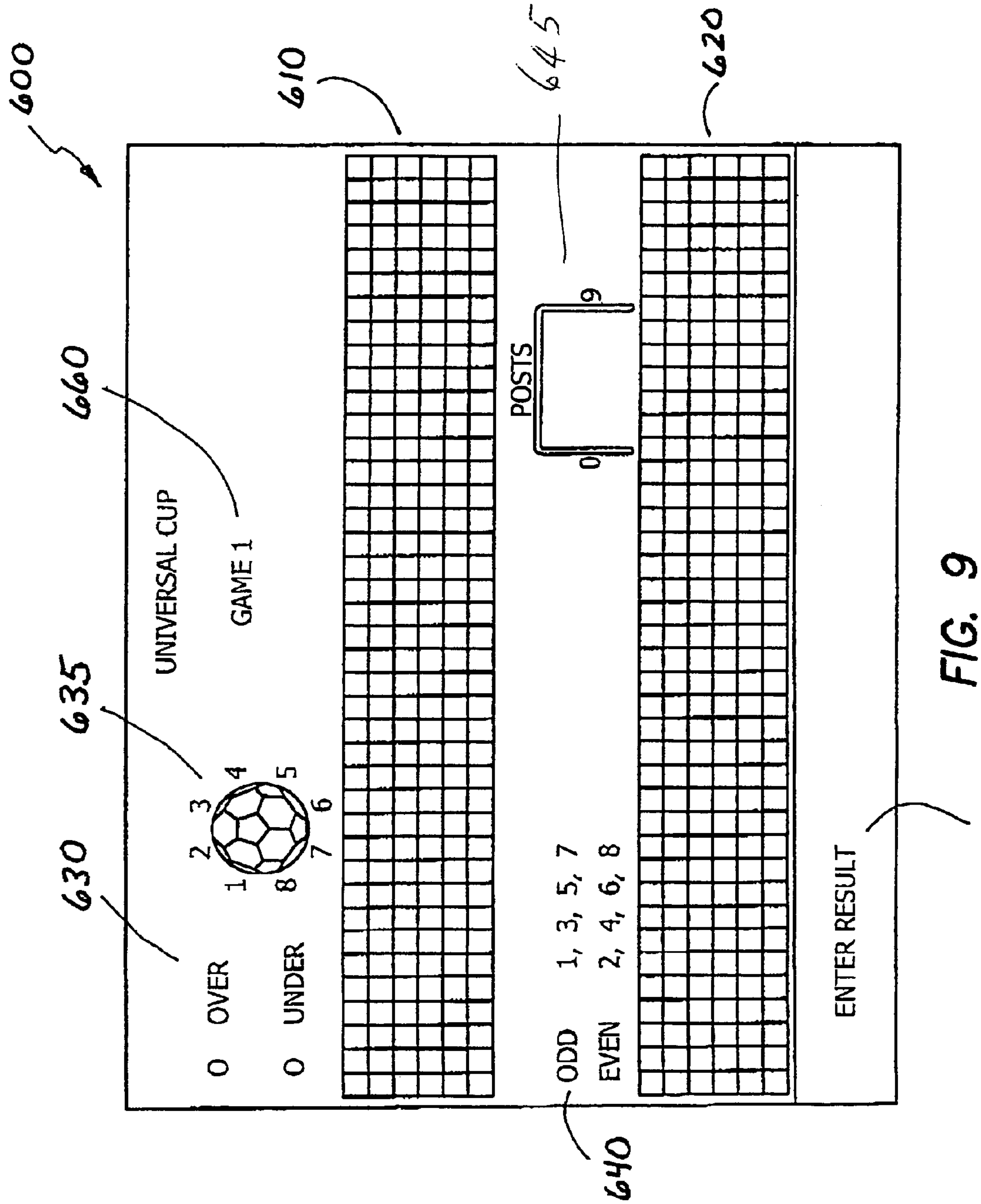
FIG. 9 illustrates a display device associated with tracking game trends.

As illustrated in FIG. 3, the wheel 200 provides eight possible unique sets of random over/under numbers. The resultant over/under numbers are then displayed on a display device 600 as illustrated in FIG. 9. The randomly generated over/under numbers remain fixed for a preestablished duration. For example, the random over/under numbers may remain fixed until an entire shoe of six decks of cards are played or until sixty hands are played. Conceivably, any duration and corresponding measurement criteria may be used.

As further illustrated in FIG. 2, the divider has the numbers 0 and 9 depicted on opposite ends thereof. The numbers 0 and 9 are deemed neither odd nor even for purposes of the embodiments of the game but are termed "posts" numbers. The significance of the posts numbers 0 and 9 is set forth below.

Instead of the wheel 200, an electronic random number generator (RNG) may be used to create the sets of random over/under numbers. Although the use of an RNG provides seventy over/under number combinations, thirty-six sets of over/under numbers are shown in FIG. 4. For simplicity, only the combinations having two even and two odd over/under number sets are illustrated. In other combinations (e.g., a set of over numbers having three odd and one even number and a set of under numbers having three even and one odd under number), new probabilities, odds and payouts are involved. Moreover, the seventy over/under number combinations include outcomes such that the over numbers are either all odd or all even (the under numbers would then be either all even or all odd, respectively). Based on the over/under and odd/even wager payouts, it is illogical to provide sets of over/under numbers comprised of either all odd or all even numbers. Therefore, the RNG is either programmed to eliminate such combinations, or if such combinations do appear, the RNG is reactivated to create a new set of over/under numbers having both odd and even combinations. The use of the RNG provides a dynamic model, rather than a fixed wheel 200, and the RNG may provide randomly selected over/under numbers during each activation of the RNG. As with the wheel 200, the randomly generated numbers are displayed on the display device 600 shown in FIG. 9 and remain fixed for a preestablished duration.

Figure 5A:
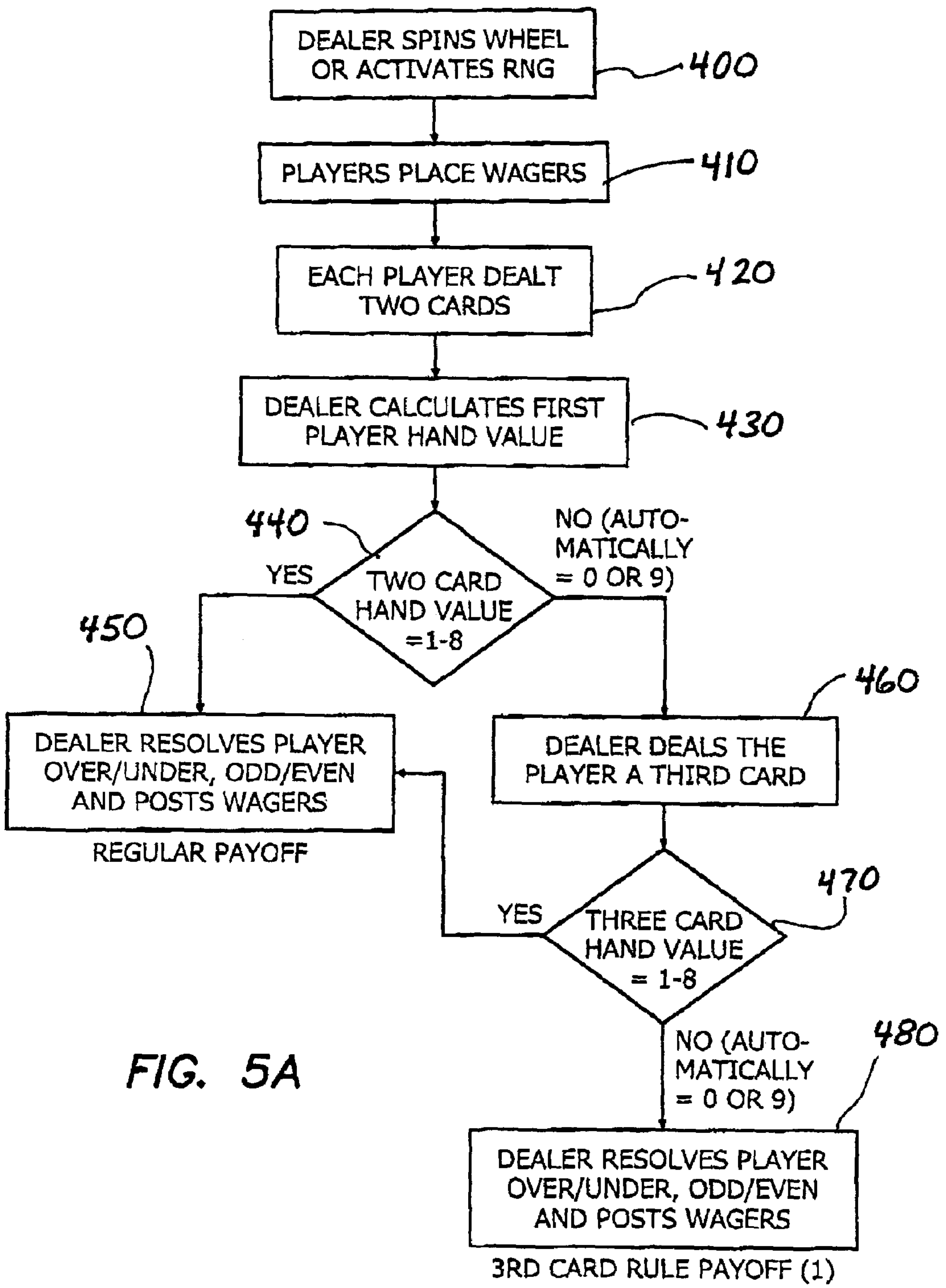
FIG. 5A illustrates a flow chart outlining a sample play of a first embodiment of the present invention.

FIG. 5A illustrates a flow chart detailing a sample play of a first embodiment of a live version of the game. At step 400, a dealer spins the wheel 200 or activates the RNG to generate the over/under numbers. Players then place their wagers at step 410. Once all wagers have been placed, each player is dealt, at step 420, two face down cards. The cards are dealt in a clockwise fashion. Thereafter, at step 430, the dealer calculates a first player's hand value. The hand value is calculated by adding the value of both cards. Tens and face cards have a value of zero, Aces have a value of one and cards 2-9 have their depicted value. Based on the combined value of the two cards, the dealer either resolves the wagers or deals a third card.

The final combined hand value is based on the modulo 10 value of the combination. In other words, a two card hand having a combined value of 10 or more results in a hand value equal to the digit in the ones position. For example, a two card value of 13 has a hand value of 3 for game purposes. At step 440, if the player's hand value is 1 through 8 inclusive, the dealer resolves the first player's over/under, odd/even and posts wagers at step 450. The over/under wager is resolved by comparing the player's hand value to the sets of random over/under numbers defined by the wheel 200 or RNG. The odd/even wagers are resolved by determining whether the hand value is odd or even. If the value of the two card hand is 1 through 8 inclusive, the posts wager is lost. As described below, if the two card value is 0 or 9, additional game steps are performed.

If the value of the initial two cards is not 1 through 8 inclusive, it must be 0 or 9 and the dealer then deals the player a third and final card at step 460. At step 470, if the three card hand value is 1 through 8 inclusive, the over/under, odd/even and posts wagers are resolved at step 450 identically to the two card hands having values 1 through 8 inclusive. If the three card hand value is 0 or 9, at step 480, the dealer resolves the over/under, odd/even and posts wagers in an alternative manner. One such manner is shown in FIG. 6. The steps shown in FIG. 5A are repeated for each wagering player's hand.

As shown in FIG. 6, in a first pay table when the value of the two card hand or three card hand is 1 through 8 inclusive, winning over/under wagers pay 0.95 to 1, winning odd/even wagers pay 1 to 1 and posts wagers are lost. The winning over/under wagers include a 5% commission for the house. If the value of the two card hand is 0 or 9, players are dealt a third card. Then, if the three card hand value is 0 or 9, over/under wagers push, odd/even wagers lose and posts wagers win and pay 8 to 1. The final column of the first pay table shows the corresponding house edge when one deck of cards is in play. Also, it is noted that the pay table, more particularly the house edge, corresponds to thirty-six sets of over/under numbers wherein both the set of over numbers and the set of under numbers include two even and two odd numbers. Alternative house edges occur when all seventy combinations are considered.

Figure 5B:
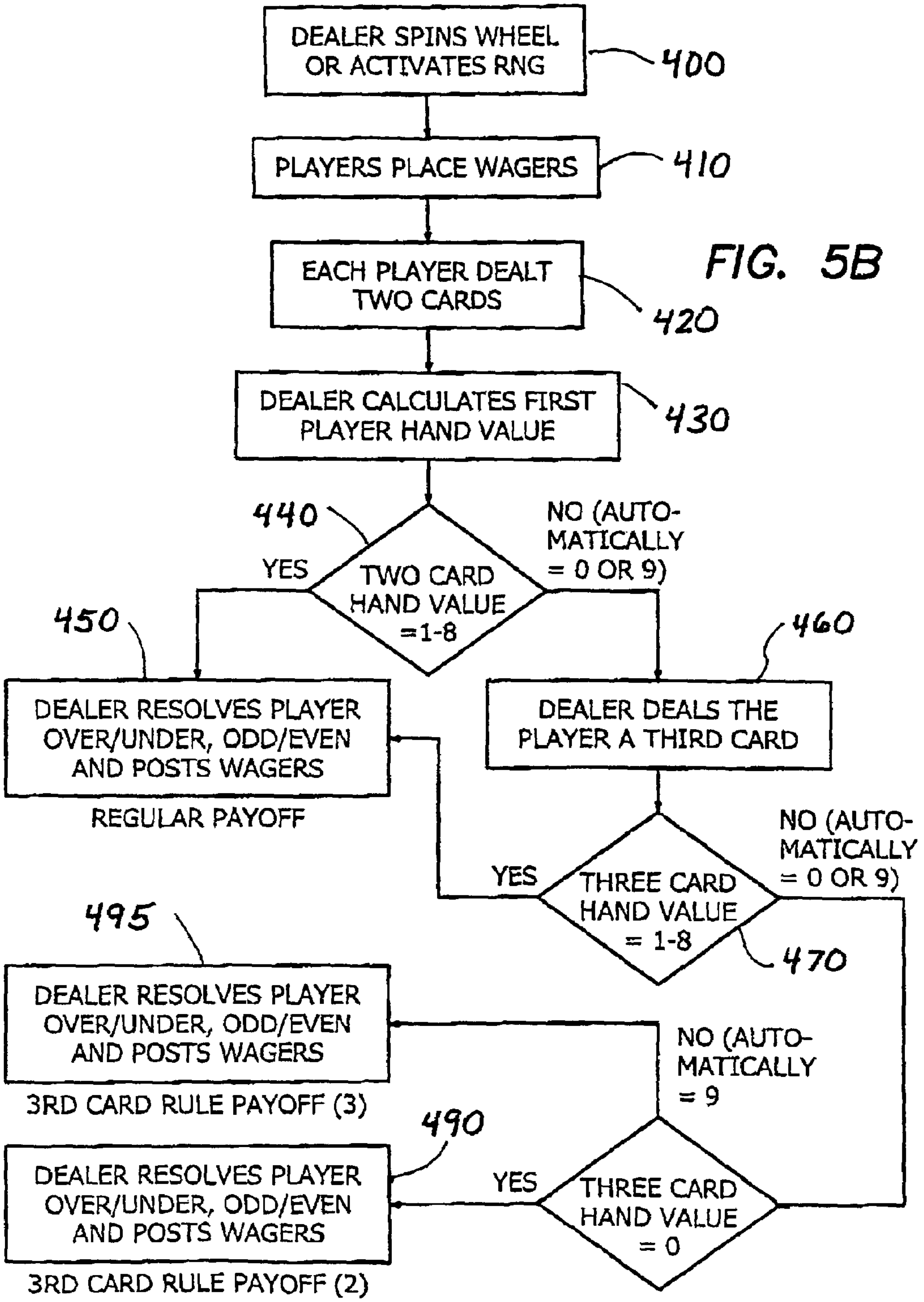
FIG. 5B illustrates a flow chart outlining a sample play of a second embodiment of the present invention.

FIG. 5B shows a second flowchart detailing a second embodiment of the present invention. More particularly, the flowchart follows a second payout schedule associated with the three card hands. Thus, the flowchart depicted in FIG. 5B is the same as the flowchart depicted in FIG. 5A up to and including step 470. However, unlike the payout schedule detailed in FIG. 5A, the alternative payout schedule makes a distinction between a three card having a value of 0 and a three card hand having a value of 9. Thus, at step 470, if the value of the three card hand is 0, the player's over/under, odd/even and posts wagers are resolved at step 490. If, at step 470, the value of the three card hand is 9, the player's over/under, odd/even and posts wagers are resolved at step 495. Payout schedules for resolving the wagers at steps 490 and 495 are set forth in FIGS. 7A and 7B. The steps of the flowchart depicted in FIG. 5B are repeated for each player.

As shown in FIG. 7A, in a second pay table when the value of the two card hand or three card is 1 through 8 inclusive, winning over/under wagers pay 1 to 1, odd/even wagers pay 1 to 1 and posts wagers are lost. Effectively, the 5% commission has been eliminated. The commission revenue is accounted for with a new payout schedule associated with the three card hands having a value of 0 or 9. Accordingly, if the three card hand value is 0, over/under wagers lose one-half, odd/even wagers lose one-half and posts wagers win and pay 8 to 1. If the three card hand value is 9, over/under wagers push, odd/even wagers lose one-half and posts wagers win and pay 8 to 1. The corresponding house edge associated with one deck of cards is also illustrated in the final column of the second pay table. Again, it is noted that the pay table, more particularly the house edge, corresponds to thirty-six sets of over/under numbers wherein both the set of over numbers and the set of under numbers include two even and two odd numbers. Alternative house edges occur when all seventy combinations are considered. FIG. 7B illustrates a pay table wherein the payouts corresponding to three card values of 0 and 9 are reversed. Accordingly, if the three card hand value is 9, over/under wagers and odd/even wagers lose one-half and posts wagers win 8 to 1. In addition, if the three card hand value is 0, over/under wagers push, odd/even wagers lose one-half and posts wagers win and pay 8 to 1. Moreover, the house edge is slightly different than set forth in the pay table of FIG. 7A.

Figure 8:
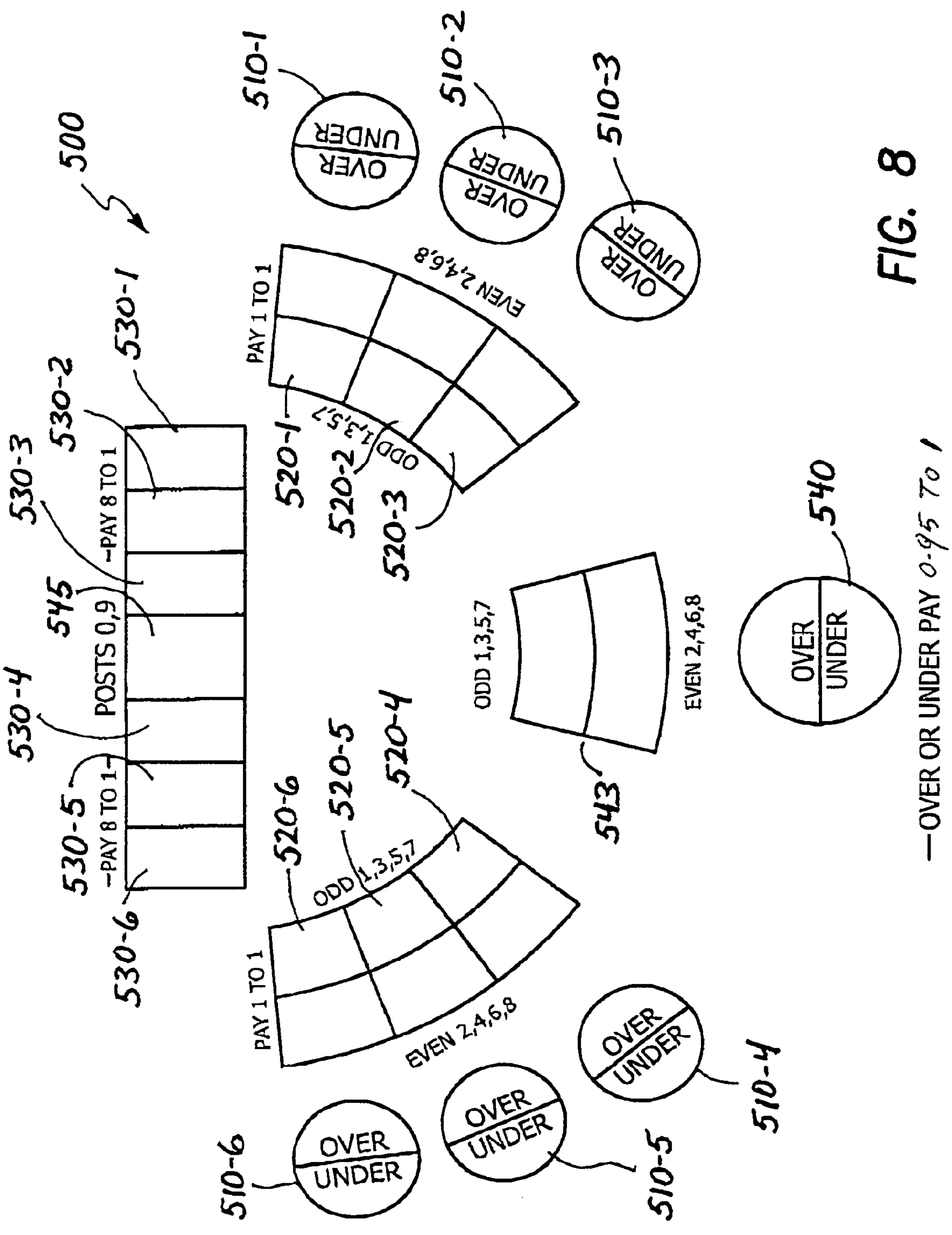
FIG. 8 illustrates a second table game layout.

In a second live version of the game, a community hand is dealt and, if desired, can be wagered upon. FIG. 8 illustrates a second table layout generally designated as reference numeral 500. The layout 500 incorporates six over/under wager areas 510-1 through 510-6, six odd/even wager areas 520-1 through 520-6, six posts wager areas 530-1 through 530-6, a community hand over/under wager area 540, a community hand odd/even wager area 543 and a community hand posts wager area 545. The layout 500 is only illustrative and may incorporate more or less than six player positions.

The play of the second live version is identical to the first live version except for the deal of a community hand. The community hand may be wagered on by all seated players and players standing about the table. Although the community hand may be dealt in any pattern along with the player hands, it is preferably dealt last. A dealer handles the community hand in this embodiment. The community hand provides several advantages. A first advantage arises in situations where each player position is occupied. Now non-seated players desiring to place wagers may place one or more wagers on the community hand. The seated players may also wager on the community hand solely, on their own hand or on both. A second advantage of the community hand is the ability to track and display the trends associated therewith.

Tracking previous wagering game outcomes is not new. In fact, Baccarat and Roulette provide players with an outcome history in the form of a display that shows previous game outcomes. In many instances, players utilize the trends to influence the wagers they make. For example, Roulette players may be influenced to place a wager on "black" when they observe that the previous six winning numbers were "red." Similarly, Baccarat players may be influenced to bet on the "bank" when the display shows that the "player" has won the last four hands. While the history of game outcomes plays no role in determining the next game outcome, players are nonetheless influenced by the trends. Moreover, a majority of Baccarat and Roulette players now demand that the trends be displayed.

As shown in FIG. 9, a display device 600 incorporates two grids 610 and 620. A first grid 610 is used to track the over/under outcomes and a second grid 620 is used to track the odd/even outcomes. Each grid 610 and 620 has a corresponding legend 630 and 640, respectively, which displays the color and symbol associated with over, under, odd, and even outcomes. In practice, the circles of the over/under grid 610 are different colors to denote an over result and an under result.

An over/under number indicator 635 displays the over and under numbers for their fixed duration. While the indicator 635 may take any form, a soccer ball is shown. The posts numbers are shown adjacent to a soccer goal 645. For reasons set forth below, a sports theme is contemplated with regard to the embodiments of the game. A bottom portion 650 of the display device 600 is used to show the most recent outcomes of the game. A game number indicator 660 displays the number of the current game. The game number is important to alert players to how many hands are remaining for the current set of fixed over and under numbers.

Figure 10:
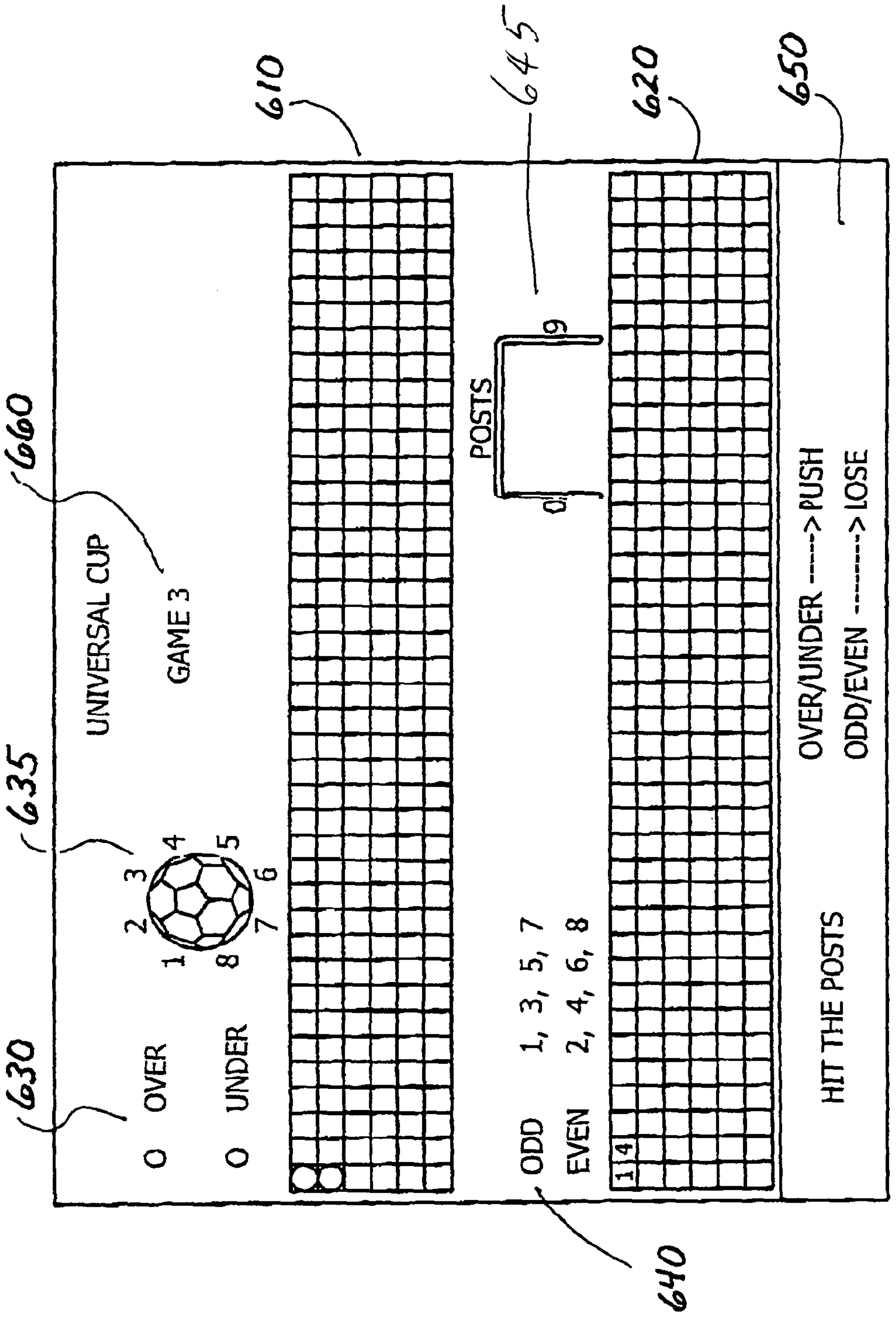
FIG. 10 illustrates the display device with displayed outcomes.
Figure 11:
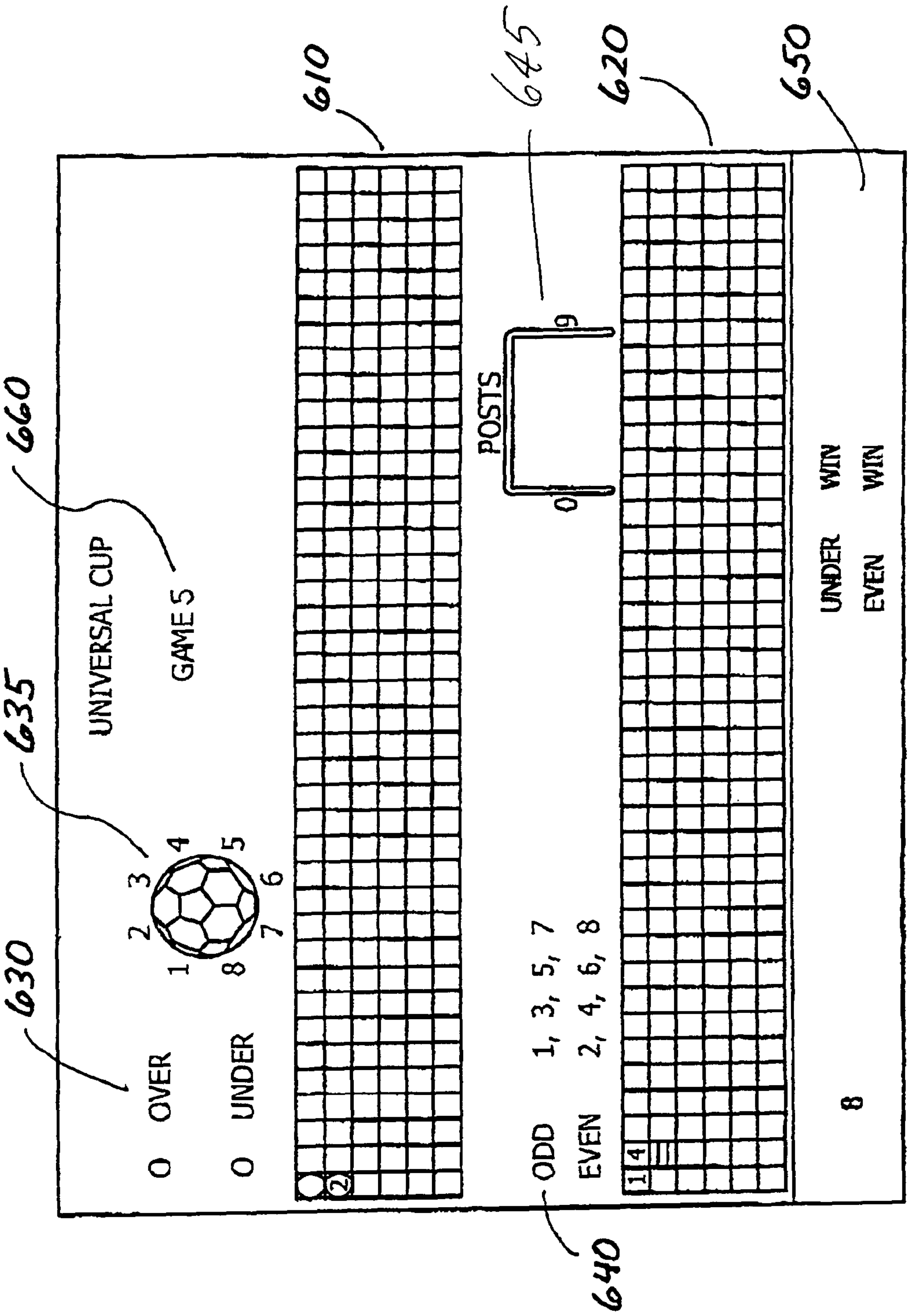
FIG. 11 illustrates the display device with additional displayed outcomes.

FIGS. 10 and 11 illustrate game outcomes depicted on the bottom portion 650. Specifically, FIG. 10 illustrates that the three card value of the community hand is a 0 or 9 (i.e., "hit the posts") and further illustrates that the over/under wagers push and the odd/even wagers lose under the payout schedule adopted. FIG. 11 illustrates that the two card value of the community hand is 8 and based on that value the under and even wagers are winners.

Figure 12:
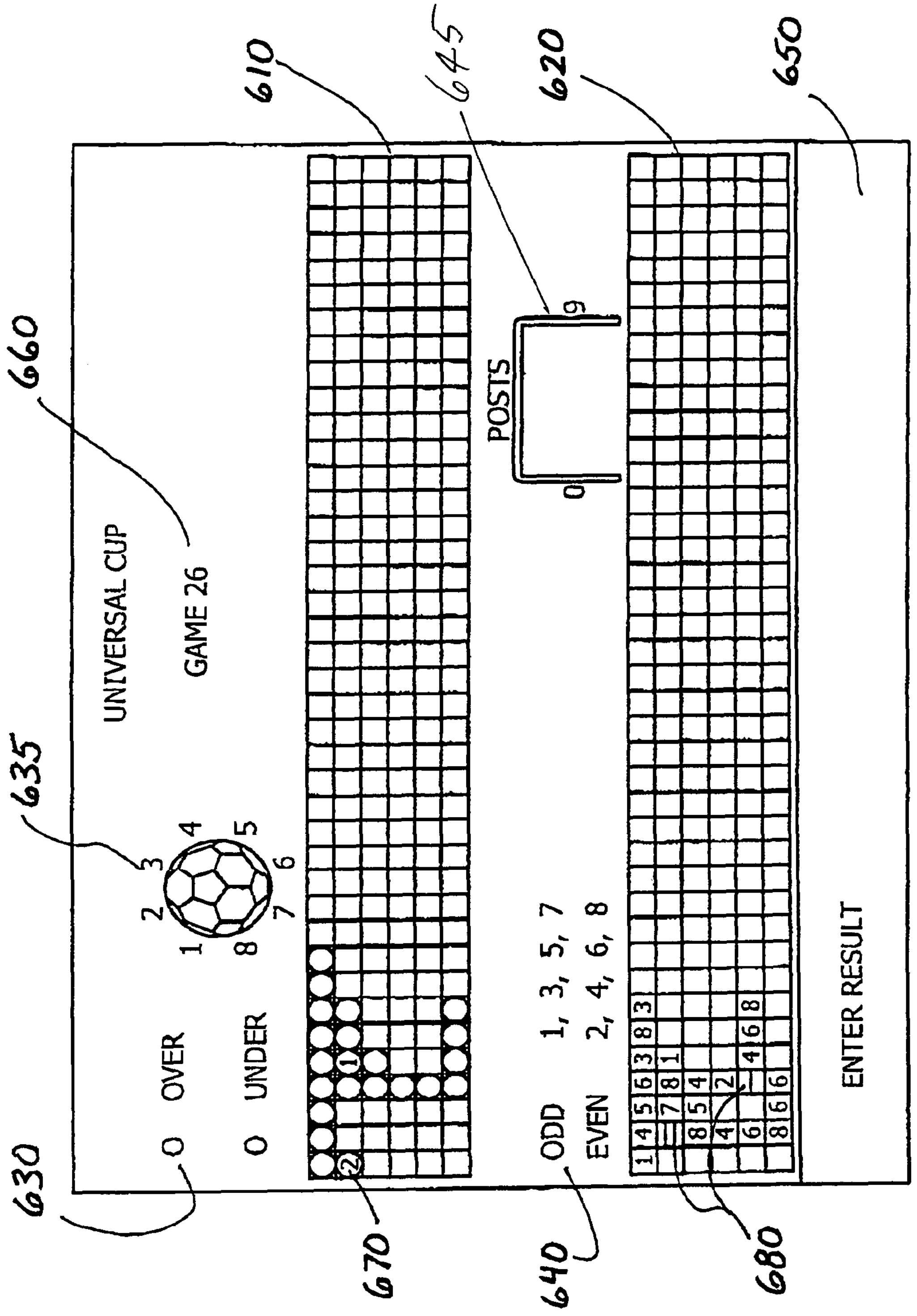
FIG. 12 illustrates the display device with displayed outcomes from the previous twenty-five games.

FIG. 12 illustrates the display device 600 showing the outcomes from the previous 25 games. The method of tracking shows trends in the vertical columns and then along the bottom row if necessary. For example, the display shows that the first two values of the community hand were 1 and 4 and both numbers were over. The back-to-back over results are shown with the two circles in the first vertical column in the over/under grid 610. Since 1 is odd and 4 is even, the odd/even grid 620 shows the number 1 and 4 in adjacent columns. An under trend is shown in the fourth column of the over/under grid 610. The trend comprises 9 straight community hand values which were under. The trend is figured by adding the six consecutive under outcomes along the column and the three additional consecutive under outcomes along the bottom row.

Within the over/under grid 610, posts (i.e., 0 or 9 values) are indicated using numerals 670 within the over/under circles. Any number above one indicates that two or more consecutive posts occurred. Therefore, a numeral 2 indicates that two consecutive community hands resulted in a 0 or 9 value. Within the odd/even grid 620, posts are indicated using a series of slashes 680. If multiple consecutive outcomes are posts, the series of slashes 680 can be both horizontal and vertical. For example, a number sign (#) indicates that four consecutive outcomes were posts. While the detailed description of tracking trends has been set forth above, many other tracking methods may be used to provide players with game trend information.

In a third live version of the game, only a community hand is dealt and wagered upon. The layout for the third version is nearly identical to the layout 500 for the second version except that the community hand over/under wager area 540, community hand odd/even wager area 543 and the community hand posts wager area 545 may be depicted in a larger format or may be highlighted by other identification means to immediately denote that all players are wagering on a single community hand. In this third version, seated players and standing players place all wagers on a single dealt community hand. Each of the rules from above apply to this third version as well. Such an arrangement creates a great deal of excitement when multiple players gather about the table and collectively celebrate winning wagers.

To provide a slight amount of player interaction, if a seated player has placed the largest wager at the table, the player handles the cards (i.e., the player acts as the dealer). Otherwise, if a standing player places the largest wager, the dealer handles the cards.

Figure 13:
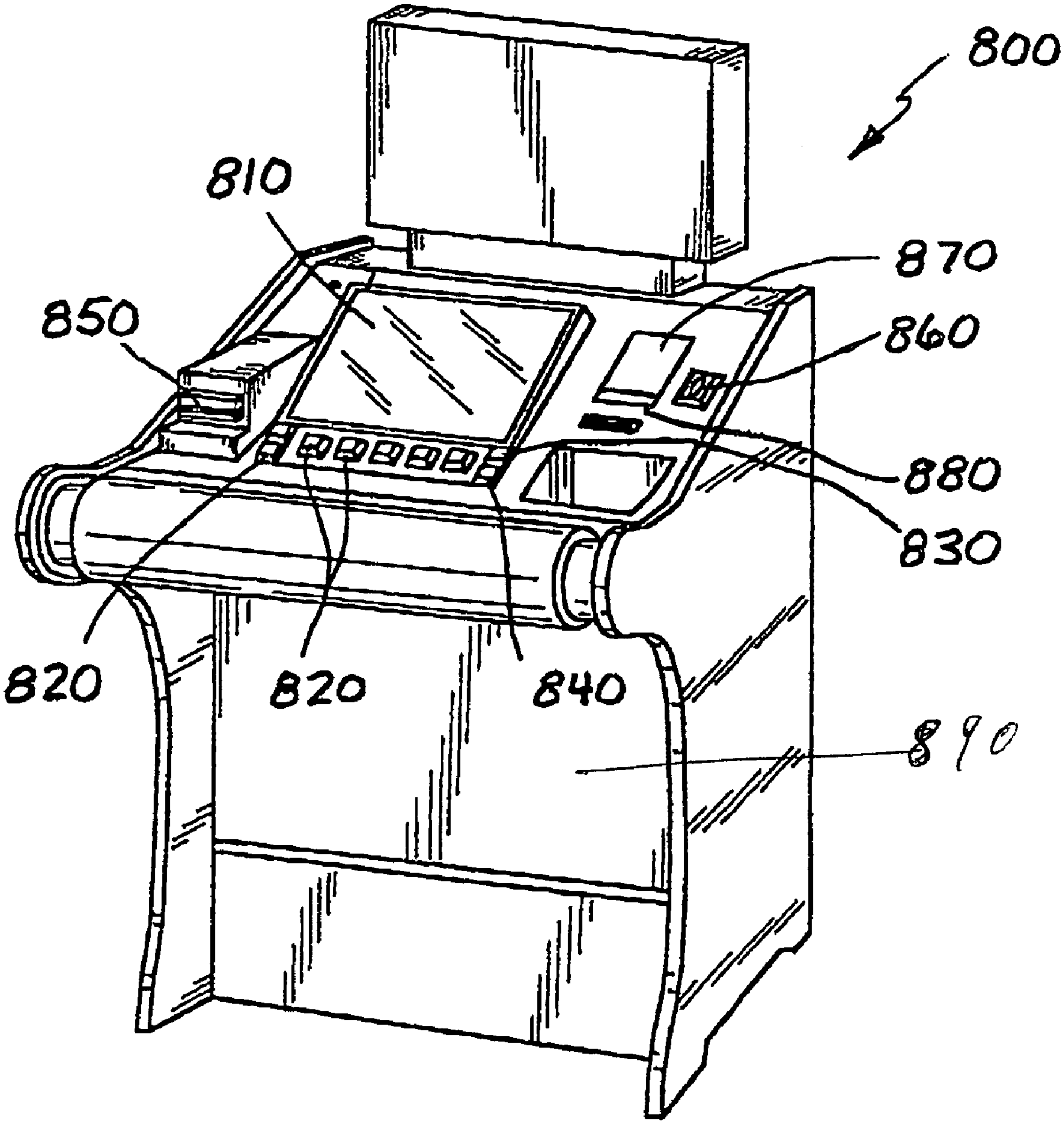
FIG. 13 illustrates a gaming machine for facilitating a gaming machine version of the embodiments of the game.

At least the third live version of the present game may also be facilitated by an electronic gaming machine. FIG. 13 illustrates an electronic gaming machine, generally designated as reference numeral 800, of the type that may be used to implement the embodiments of the present invention in an electronic format. The external features of the gaming machine 800 include a display 810, wager selection buttons 820, a maximum wager button 830, a single denomination wager button 840, a card reader 850, a coin slot 860, a credit display 870 and a bill reader 880. While not shown, the gaming machine 800 can also incorporate a ticket reader and printer for facilitating cashless play.

The operation of the gaming machine 800 is controlled by a microprocessor that communicates with an internal memory device and the external features of the machine. The microprocessor also incorporates, or communicates with, a RNG which ensures the randomness of the over/under numbers and the cards dealt during the play of the game. Since the technology for controlling gaming machines is well known to those skilled in the art, the subtle details are not described herein.

Once implemented in the electronic format, a sample play of the game may proceed as described hereinafter. A player first inputs a wager by using the coin slot 860, bill reader 880 or the ticket reader. The wager can either be in the form of a single denomination wager (e.g. $5) or the player may insert a larger amount of money which the machine 800 displays on the credit display 870 so that the player can play on registered credit. On credit, the player may use the maximum wager button 830 or the single denomination wager button 840 to select the denominations of the over/under, odd/even and/or posts wagers. The machine may also incorporate touchscreen technology to allow the player to select the wagers and amounts by touching portions of the display 810.

Then the processor, more particularly the (RNG) in communication with the processor, causes the over/under numbers to be randomly generated. Once generated the over/under numbers are displayed on the display 810 in a manner similar to the live version. To add to the level of excitement, the display 810 may show a simulated wheel spinning to a stop with the over numbers defined above a simulated wheel divider and the lower numbers defined below the simulated divider. In this manner, the thirty-six unique outcomes whereby both the over set and under set of numbers include two even and two odd numbers (as indicated above there are actually seventy total combinations) are available in a wheel format. Then, the RNG selects two cards and prompts the processor to display a single two card hand. Based on the selected wagers, the displayed two cards and one or more preestablished pay tables stored in the memory device of the gaming machine 800, the processor determines the amount of any payouts. The payouts can be delivered to the player in coins or may be added to the credit total of the player displayed on the credit display 870. If the two card hand value is 0 or 9, the RNG selects a third card and prompts the processor to display the third card after which the processor determines the payouts based on the value of the three card hand.

The display 810 also displays the previous game outcomes in a format similar to the live version display device 600. However, the outcomes are now displayed on a portion of the display 810 of the gaming machine 800.

In a conventional fashion, the preestablished payouts of the gaming machine 800 may be depicted on an external surface 890 of the gaming machine 800. Typically gaming machines have printed or etched glass depicting, game names, game rules, pay tables and generally any information related to the game being facilitated by the gaming machine.

In the gaming machine embodiment, the over/numbers can be much more flexible. For example, if a first player leaves a machine after less than sixty hands have been played, a second player may begin where the first player left off. In other words, the over/numbers remain fixed for the sixty hands regardless of the number of players which play the machine. Alternatively, the player may be permitted to cause the machine 800 to randomly re-select new over/under numbers by depressing a "re-select button" (not shown) incorporated on the gaming machine 800. In another alternative, the player is provided means to select the over/under numbers of his or her choice. The processor will cause the display of the previous game outcomes to reset for each new set of over/under numbers selected. Ideally, whether determined by re-selection or player choice, the sets of over/under numbers each include two even and two odd numbers to stabilize the house edge.

While not shown, it is also common to allow multiple players to participate in a wagering game facilitated by a single gaming machine. For example, horse racing and roulette are both implemented in gaming machines playable by multiple players. Such gaming machines typically include a display viewable by multiple players and includes a plurality of player wager areas which act as interfaces between the players and the gaming machine. In such an arrangement, the table game version of the game is played in an electronic format. Players may then wager on both their own hands and a community hand by depositing money into the machine. Once the gaming machine generates the over/under numbers, then all players may place their wagers. Then, the gaming machine deals players their cards. The gaming machine then follows the rules of the game and issues player payouts corresponding to the player wagers.

The gaming machine 800 and live versions may also follow a sports theme. The underlying concept of the present game is that the over/under wagers relate to sports wagering and the term "posts" relate to field goal posts or soccer goal posts. The applicant has named the embodiments of the game "Universal Cup Football." In promoting the sports theme, the display device 600 and/or the gaming machine display 810 may incorporate video clips of soccer or American football when the three card value is 0 or 9. For example, the video may show a soccer ball or football hitting a soccer goal post or field goal post, respectively. Moreover, the over/under number indicator can take the shape of an American football as well as the previously described soccer ball.

While specific numbers of cards, card values, over/under numbers and related game information have been described in detail, they are not meant to limit the scope of this patent to these specific criteria. Therefore, although the invention has been described in detail with reference to a preferred embodiment, additional variations and modifications exist within the scope and spirit of the invention as described and defined in the following claims.

I claim:

1. A method of playing a wagering game using one or more decks of cards comprising:

generating a set of random over numbers and a set of random under numbers from a group of numbers;

accepting one or more wagers from one or more players;

dealing each wagering player one or more cards;

determining a value of the one or more player cards;

resolving an over/under player wager by determining whether the value of the one or more cards is in the set of over numbers or in the set of under numbers; and if said value is equal to one or more preestablished numbers outside the preestablished range, dealing the player an additional final card and resolving the over/under wager by determining whether the value of all player cards is in the set of over numbers or in the set of under numbers.

2. The method of claim 1 wherein resolving an odd/even player wager comprises determining whether the value of the one or more player cards is odd or even.

3. The method of claim 1 wherein generating the set of random over numbers and the set of random under numbers is accomplished by using a rotatable wheel, having a plurality of numbers depicted thereon, in combination with a wheel divider.

4. The method of claim 1 wherein generating the set of random over numbers and the set of random under numbers is accomplished by using an electronic random number generator.

5. The method of claim 1 wherein modulo 10 is used to determine the value of the one or more player cards.

6. The method of claim 1 wherein an additional final card is dealt to each wagering player receiving one or more cards having a value of 0 or 9.

7. The method of claim 6 wherein resolving a posts player wager comprises determining whether the value of all player cards is 0 or 9.

8. The method of claim 1 wherein the set of random over numbers and the set of random under numbers each include four unique numbers between 1 and 8.

9. A method of playing a wagering game using one or more decks of cards comprising:

prior to each new game, generating a new set of random over numbers and a new set of random under numbers from a group of numbers;

accepting one or more wagers from one or more players, said wagers being placed on either a player hand, a community hand or both;

dealing each wagering player one or more cards;

dealing one or more cards to form a community hand;

determining a value of the one or more player cards and the two card community hand;

resolving an over/under player wager on the player's hand by determining whether the value of the one or more player cards is in the set of over numbers or in the set of under numbers;

if said value is equal to one or more preestablished numbers outside the preestablished range, dealing the player an additional final card and resolving the over/under wager by determining whether the value of all player cards is in the set of over numbers or in the set of under numbers; and resolving an over/under player wager on the community hand by determining whether the community hand is in the set of over numbers or in the set of under numbers.

10. The method of claim 9 wherein resolving an odd/even player wager on the players hand comprises determining whether the value of the one or more player cards is odd or even; and resolving an over/under player wager on the community hand by determining whether the value of the community cards is odd or even.

11. The method of claim 9 wherein generating the set of random over numbers and the set of random under numbers is accomplished by using a rotatable wheel, having a plurality of numbers depicted thereon, in combination with a wheel divider.

12. The method of claim 9 wherein generating the set of random over numbers and the set of random under numbers is accomplished by using an electronic random number generator.

13. The method of claim 9 wherein modulo 10 is used to determine the value of the one or more player cards and the community cards.

14. The method of claim 9 wherein each wagering player and the community is dealt an additional final card when the player or the community is dealt one or more cards having a value of 0 or 9, respectively.

15. The method of claim 14 wherein resolving a posts player wager on the player's hand or the community hand comprises determining whether all the player cards or all the community cards is 0 or 9, respectively.

16. The method of claim 9 wherein the set of random over numbers and the set of random under numbers each include four unique numbers between 1 and 8.

17. The method of claim 9 wherein the value of the one or more community cards is displayed on a display device.

18. The method of claim 14 wherein the value of the one or more community cards is displayed on a display device.

19. A method of playing a wagering game using one or more decks of cards comprising:

generating a set of random over numbers and a set of random under numbers from a group of numbers;

accepting one or more wagers from one or more players, said wagers being placed on a community hand;

dealing one or more cards to form a community hand;

determining a value of the community cards;

resolving an over/under player wager by determining whether the value of the one or more community cards is in the set of over numbers or in the set of under numbers; and if said value is equal to one or more preestablished numbers outside the preestablished range, dealing the player an additional final card and resolving the over/under wager by determining whether the value of all player cards is in the set of over numbers or in the set of under numbers.

20. The method of claim 19 wherein resolving an odd/even player wager comprises determining whether the value of the one or more community cards is odd or even.

21. The method of claim 19 wherein generating the set of random over numbers and the set of random under numbers is accomplished by using a rotatable wheel, having a plurality of numbers depicted thereon, in combination with a wheel divider.

22. The method of claim 19 wherein generating the set of random over numbers and the set of random under numbers is accomplished with an electronic random number generator.

23. The method of claim 19 wherein modulo 10 is used to determine the value of the one or more community cards.

24. The method of claim 19 wherein an additional final card is dealt to the community hand when the one or more community cards has a combined value of 0 or 9.

25. The method of claim 24 wherein resolving a posts player wager comprises determining whether the value of all community cards is 0 or 9.

26. The method of claim 25 wherein the set of random over numbers and the set of random under numbers each include four unique numbers between 1 and 8.

27. The method of claim 19 wherein the value of the community cards is displayed on a display device.

28. The method of claim 24 wherein the value of all community cards is displayed on a display device.

29. A method of playing a wagering game using one or more decks of cards comprising:

generating a set of random over numbers and a set of random under numbers;

accepting one or more wagers from one or more players;

dealing each wagering player one or more cards;

determining a value of the one or more player cards;

if said combined value is within a preestablished range, resolving an over/under player wager by determining whether the value of the one or more player cards is in the set of over numbers or in the set of under numbers; and if said value is equal to one or more preestablished numbers outside the preestablished range, dealing the player an additional final card and resolving the over/ under wager by determining whether the value of all player cards is in the set of over numbers or in the set of under numbers.

30. The method of claim 29 wherein resolving an odd/even player wager comprises determining whether the value of the one or more player cards is odd or even.

31. The method of claim 29 wherein resolving a posts player wager comprises determining whether the value of all player cards is 0 or 9.

32. A method of playing a wagering game using one or more decks of cards comprising:

generating a set of random over numbers and a set of random under numbers;

accepting one or more wagers from one or more players;

dealing one or more cards to form a community hand;

determining a value of the community cards;

if said value is within a preestablished range, resolving an over/under player wager by determining whether the value of the one or more community cards is in the set of over numbers or in the set of under numbers; and if said value is equal to one or more preestablished numbers outside the preestablished range, dealing an additional final community card and resolving the over/under wager by determining whether the value of all community cards is in the set of over numbers or in the set of under numbers.

33. The method of claim 32 wherein resolving an odd/even player wager comprises determining whether the value of the one or more community cards is odd or even.

34. The method of claim 32 wherein resolving a posts player wager comprises determining whether a value of all community cards is 0 or 9.

35. A method of playing a wagering game using one or more decks of cards comprising:

generating a set of random over numbers and a set of random under numbers;

accepting one or more wagers from one or more players, said wagers being on a player hand, a community hand or both;

dealing each wagering player one or more cards;

dealing one or more cards to form a community hand;

determining a value of the one or more player cards and the one or more community cards;

if said value of the player hand is within a preestablished range, resolving an over/under player wager on the player's hand by determining whether the value of the one or more player cards is in the set of over numbers or in the set of under numbers;

if said value of the player hand is equal to one or more preestablished numbers outside the preestablished range, dealing the player an additional final card and resolving the over/under player wager on the player's hand by determining whether the value of all the player cards is in the set of over numbers or in the set of under numbers;

if said value of the community hand is within a preestablished range, resolving an over/under player wager on the community hand by determining whether the value of the one or more community cards is in the set of over numbers or in the set of under numbers; and if said value of the community hand is equal to one or more preestablished numbers outside the preestablished range, dealing an additional final community card and resolving the over/under player wager on the community hand by determining whether the value of all community cards is in the set of over numbers or in the set of under numbers.

36. The method of claim 34 wherein resolving an odd/even player wager on the player's hand comprises determining whether the value of the one or more player cards is odd or even; and resolving an odd/even player wager on the community hand by determining whether the value of the one or more community cards is odd or even.

37. The method of claim 34 wherein resolving a posts player wager on the player's hand comprises determining whether the value of the one or more player cards is 0 or 9; and resolving a posts player wager on the community hand by determining whether the value of the one or more community cards is 0 or 9.

* * * * *